United States Patent [19] [11] 4,408,210
Cieplik [45] Oct. 4, 1983

[54] PAPER FEED AND FUSING ASSEMBLY FOR MAGNETOGRAPHIC PRINTING APPARATUS

[75] Inventor: Ronald J. Cieplik, Mountain Lakes, N.J.

[73] Assignee: Wang Laboratories, Inc., Lowell, Mass.

[21] Appl. No.: 292,092

[22] Filed: Aug. 12, 1981

[51] Int. Cl.³ .............. G01D 15/12
[52] U.S. Cl. .............. 346/74.2
[58] Field of Search .............. 346/74.2, 153.1, 160.1; 355/3 TR

[56] References Cited

U.S. PATENT DOCUMENTS 3,644,930 2/1972 Strange et al. .............. 346/160.1
4,110,758 8/1978 Nelson .............. 346/74.2

*Primary Examiner*—Thomas H. Tarcza
*Attorney, Agent, or Firm*—Michael H. Shanahan; Joseph E. Funk

[57] ABSTRACT

Magnetographic printing apparatus includes relatively movable component supports which provide for ready access to a magnetizable recording medium when in an access position and desirably limited length travel path, when in an operative position, for a visual image recording medium adapted to receive a toner-developed image from the recording medium. One such component support is a substrate supporting selective image-producing components for collective movement between access and operative positions and defining a portion of the visual image recording medium travel path. The remaining portion of such path is defined by components fixedly supported for registry with such movable component support in such operative position.

14 Claims, 8 Drawing Figures

PAPER FEED AND FUSING ASSEMBLY FOR MAGNETOGRAPHIC PRINTING APPARATUS

FIELD OF THE INVENTION

This invention relates generally to visual image production and pertains, more particularly, to magnetographic printing apparatus responsive to digital data signals and the like.

BACKGROUND OF THE INVENTION

The various types of magnetographic printers presently known from patents, publications and commercial efforts generally involve a common operational process based on the use of a magnetizable tape which is advanced successively through the several functional stations involved in visual image production. Initially, the tape is exposed to a magnetic image, typically rendered by a magnetic recording head responsively to digital data signals containing image information. Such magnetic image is latent and the tape is conveyed to a developing station where toner particles are applied to the tape. The tape is next advanced to a transfer station at which point the tape is stopped and the toner-developed latent image is transferred to a visual image recording medium, such as paper. The image upon the paper is of preliminary character following such transfer in that it is readily disturbed. Fusing apparatus receives the paper and renders the visual image permanent. The tape is advanced through a cleaning station in preparation for further cycles in which the foregoing steps are repeated.

As the tape is typically an elongate endless web, it is advanced lineally past the magnetic head and the characters of the image appear successively lengthwise along the tape. To transfer such information to paper so as to define a line of text, the paper need be moved in a direction transverse to the direction of movement of the tape. Thus, a paper path need be established from a paper supply and through the tape transport apparatus and then into apparatus for rendering permanent the transferred image, for example, a heat fusing station. Employment of a limited length paper travel path is desirable between the point of image transfer and the point of image fusion, as the preliminary image is tenuous.

Apart from the various design parameters, above noted, i.e., tape movement control, transverse paths for magnetic tape and paper and limited path length for paper movement, the magnetographic printer designer is faced with the further consideration that the environment in which the tape is used is relatively abrasive, involving the cyclic application to and removal from the sensitive tape of coarse toner particles. Accordingly, the tape should be readily replaceable. Further, there is need for maintaining the toner reservoir in such location that stray toner does not find its way to the tape or mechanism. From applicant's point of view, there has not been heretofore provided a satisfactory compromise among these several competing design demands, such that past known magnetographic printers have had less than desired commercial realization.

SUMMARY OF THE INVENTION

The present invention has, as its primary object, the provision of improved magnetographic printing apparatus which satisfies the foregoing design demands.

A more particular object of the invention is to provide magnetographic printing apparatus, wherein magnetic tape changing is facilitated, wherein paper travel path is minimized, and wherein the likelihood of stray toner being applied to the tape or mechanism is essentially eliminated.

In attaining the foregoing, and other objects, the invention provides magnetographic printing apparatus wherein selected component parts of the apparatus are disposed in a fixed position relative to the other component parts. Such other component parts are supported for collective movement into an access position, wherein tape change may be readily effected, and therefrom collectively into operative position, wherein they register with the fixedly positioned components.

In a particularly preferred embodiment, the selection of fixed and collectively movable components is made on the basis of disposing the toner reservoir and the recording head immobile and distal, for example, vertically below the remaining components, both to avoid unnecessary movement of the recording head and to dispel the influence of gravity in applying stray toner to the tape or mechanism. The fusing component is also fixedly positioned and is provided with a heat shield.

As for such other components, they may be jointly mounted upon a substrate which is supported for movement beween such access and operative positions. The substrate defines therethrough a portion of the paper path and provides for registry of such portion with the remainder of the paper path as defined by the fusing component and heat shield.

The foregoing and other objects and features of the invention will be further evident from the following detailed description thereof and from the drawings wherein like reference numerals identify like parts throughout.

DESCRIPTION OF THE PREFERRED EMBODIMENT

Figure 1:
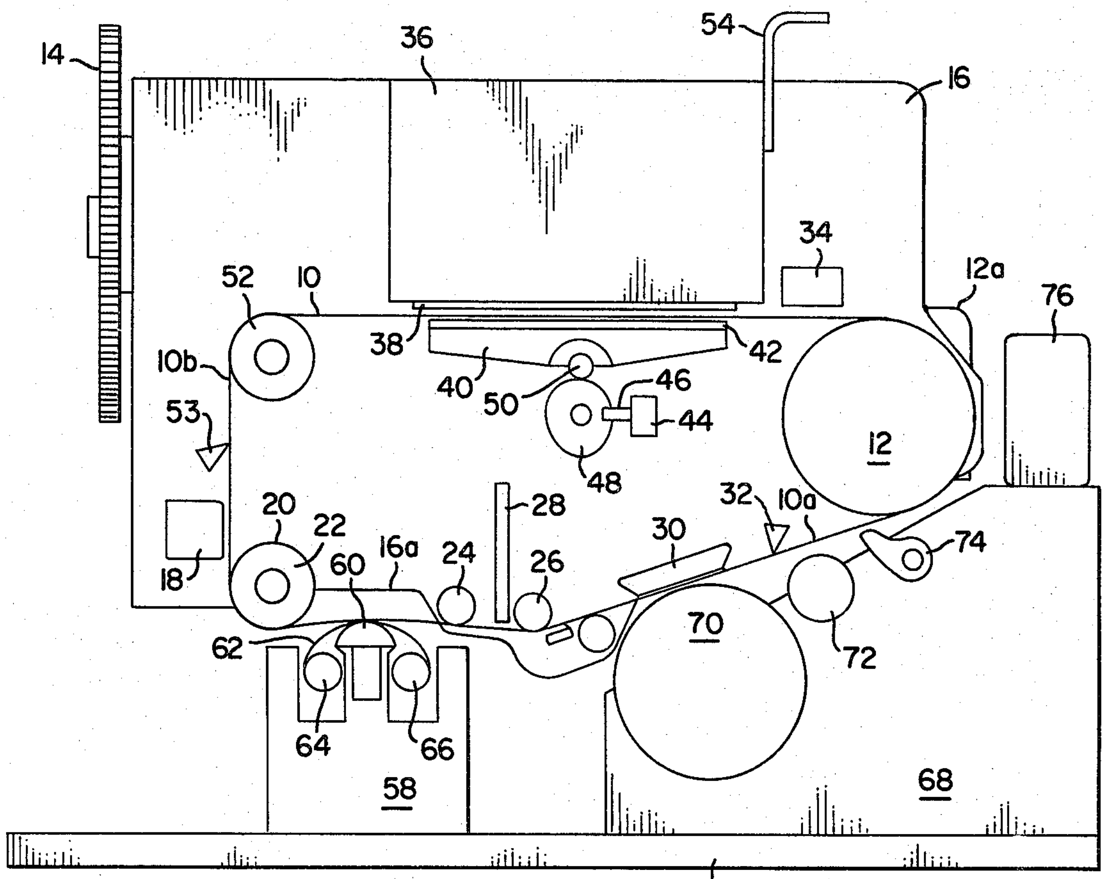
FIG. 1 is a front elevational view of those components of a magnetographic printer in accordance with the invention which provide for a visual but not yet fused image.

Referring to FIG. 1, magnetizable recording medium 10 is in the form of an endless belt or tape partly circumscribing tape drive pulley 12 which is suitably mounted to the shaft of tape drive motor 12*a* to be rotated counterclockwise and advance tape 10 in like direction. Substrate 16 is a plate member supporting components of FIG. 1, now discussed, to define what may be termed a tape deck. Premagnetization member 18 is positioned at the lower left corner of substrate 16 and initiates each cycle of use of tape 10 by magnetizing same, such that the tape is transversely aligned in uniform manner. End roller 20 is shaped conically as at 22 outwardly of its tape engaging portion adjacent substrate 16 to facilitate tape replacement and is cooperative with guide roller 24 to provide means for disposing tape 10 outwardly of lower side margin portion 16*a* of substrate 16. The tape is further dispositionally controlled by guide rollers 24 and 26 to be in precise registry with sensor 28, which is operative to detect holes or like tape characteristics to interrupt tape movement for image transfer purposes.

Successive to guide roller 26 in the direction of tape advance are a developer station magnetic field enhancer 30 and a vacuum/scraper arrangement 32, the latter contiguously engaging the back surface 10*a* of tape 10 to remove dust particles and any stray toner therefrom. Beyond tape drive pulley 12 is a corotron 34, comprising an ionizing source and bias screen adjacent tape 10, for imparting electrical charge thereto.

Transfer electrode 36 is supported adjacent paper passage channel 38 which extends through substrate 16 horizontally through the plane of FIG. 1 at a location slightly above tape 10. Below tape 10 and in facing relation to electrode 36 is platen 40 having resilient pad 42 on its upper surface. The platen is suitably supported for vertical translation in FIG. 1 under control of motor 44, the output shaft 46 of which frictionally drives cam 48, which in turn is biased into engagement with follower 50 of platen 40. Leftwardly of such transfer station is end roller 52, which with end roller 22, may be suitably spring-biased horizontally leftward to maintain appropriate tape tension. Upon passing by roller 52, tape front surface 10*b* is contiguously engaged by another vacuum/scraper arrangement 53 to prepare clean tape for the ensuing cycle. A handle 54 extends upwardly of substrate 16 and may be employed to displace substate 16 from its FIG. 1 position.

As above noted, the foregoing components are collectively supported on substate 16 for joint movement therewith, as are driven gear or pulley 14 and paper advancing means to be discussed below. Conversely, remaining components of FIG. 1 are fixedly supported on immobile base substrate 56 in locations selectively registering with substate 16 in its illustrated FIG. 1 operative position. Thus, record unit 58 is situated to provide for registry of head 60 with recessed substate side margin 16*a* such that tape 10 is biased against record unit 58 by end roller 22 and guide roller 24. A protective film 62 is fed between cartridge reels 64 and 66 and is interposed between head 60 and tape 10. Likewise, developer unit 68 is positioned on base substrate 56 such that toner applicator roller 70 is in registry with magnetic enhancer 30 and that scavenger roller 72 and vacuum nozzle 74 for background cleaning are situated sufficiently adjacent tape 10 to remove excess toner therefrom upon latent magnetic image development. Toner cartridge 76 may be disposed outwardly of substrate 16 to be readily replaced.

Figure 2:
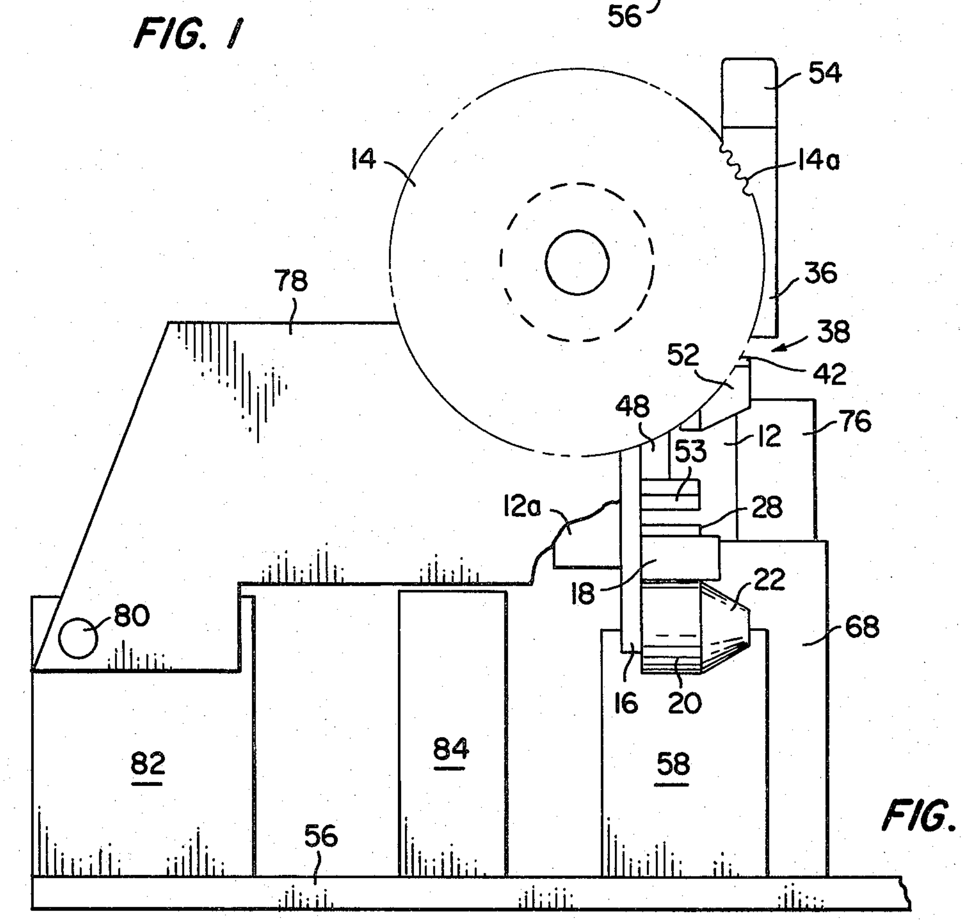
FIG. 2 is side elevation of the FIG. 1 assembly, with the recording tape omitted for clarity.
Figure 3:
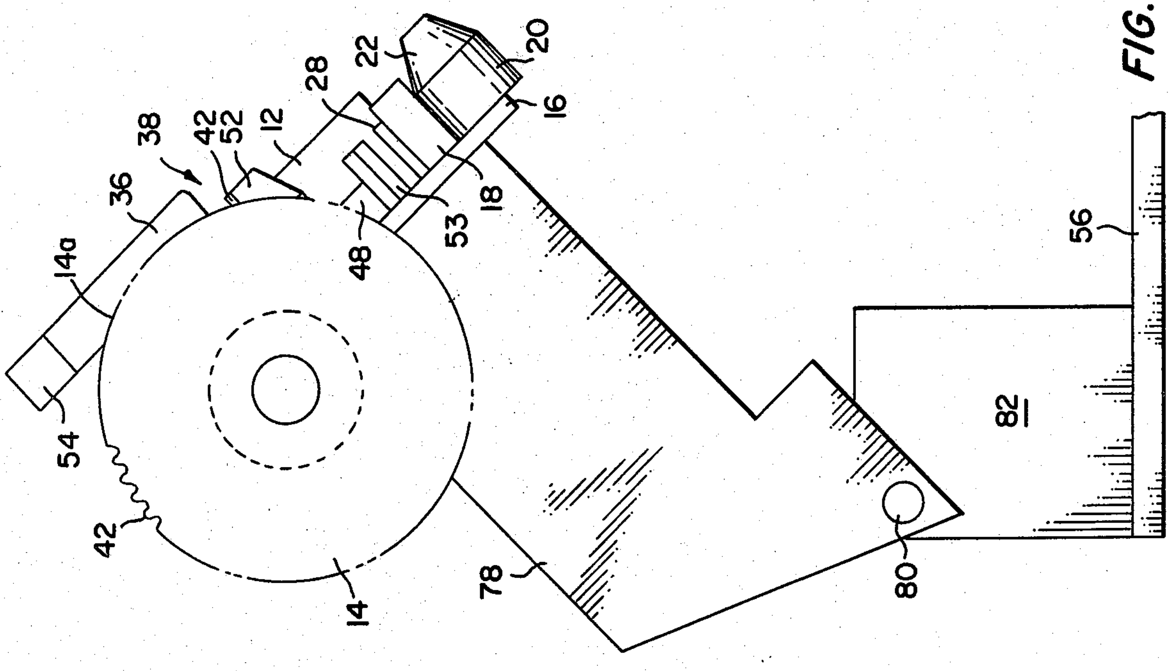
FIG. 3 is a partial side elevation of the FIG. 1 assembly depicting the collectively supported upper components of FIG. 1 moved to a position providing access thereto.

As will be seen in FIG. 2, support 78 extends from substate 16 to pivotal connection through pin 80 with arm 82 upstanding on base substrate 56. A stop member 84 also secured on base substrate 56 abuts support 78 to define the clockwise limit for support 78 and is selected in height to provide that substrate 16 is in substantially vertical attitude in its operative position. In FIG. 3, support 78 is shown in its counterclockwise (tapedeck inoperative) position, wherein it may be releasably latched to facilitate changing of tape 10 or repair and replacement of others of the jointly mounted components, e.g., scrapers 32 and 53, which may be releasable blades. As noted previously, tape 10 is subjected to substantial mechanical force by such scraping activity and tape replacement is accordingly a matter to be expedited. With the tape deck in such inoperative or access position, one may also readily replace the cartridge of protective film 62 and has access to developer unit 68 for replacement or inspection purposes.

Figure 4:
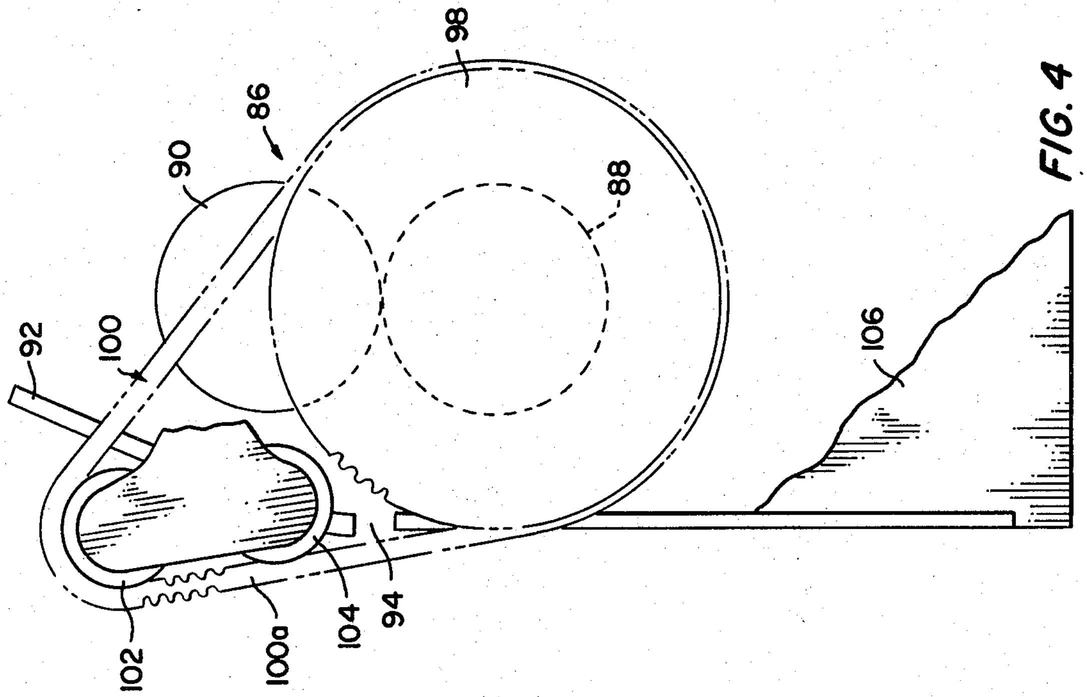
FIG. 4 is a schematic side elevation of the printer components providing for fusion of a visual image and for imparting drive to the FIG. 1 assembly.

In the side elevation showing of FIG. 4, which schematically illustrates further components of the subject printer, a visual image fusion unit 86 includes fuser roller 88 and pressure roller 90 suitably spring-biased onto the fuser roller to define a paper-receptive nip therebetween. Heat shield 92 serves to limit the egress of heat generated by fuser roller 88 from unit 86, thereby lessening temperatures leftwardly of shield 92. A paper path channel 94 is provided through shield 92 in registry with the leftward opening nip of rollers 88 and 90. Also shown is a further portion of the printer drive mechanism, comprising belt 100 and gear or pulley 98 directly concentrically mounted with driven fuser roller 88. Rollers 102 and 104 engage the inner surface of belt 100 in indicated locations with roller 102 somewhat leftward of roller 104, thereby providing that an extent 100*a* of belt 100 is in an attitude tilted away from true vertical. Belt 100 is a flexible member, preferably comprised of a rubber central web having undulated outer surfaces defining grooves projecting inwardly from both sides of the belt. Support 106 provides journal support for roller 88 and is in turn fixedly supported by base substrate 56.

Figure 5:
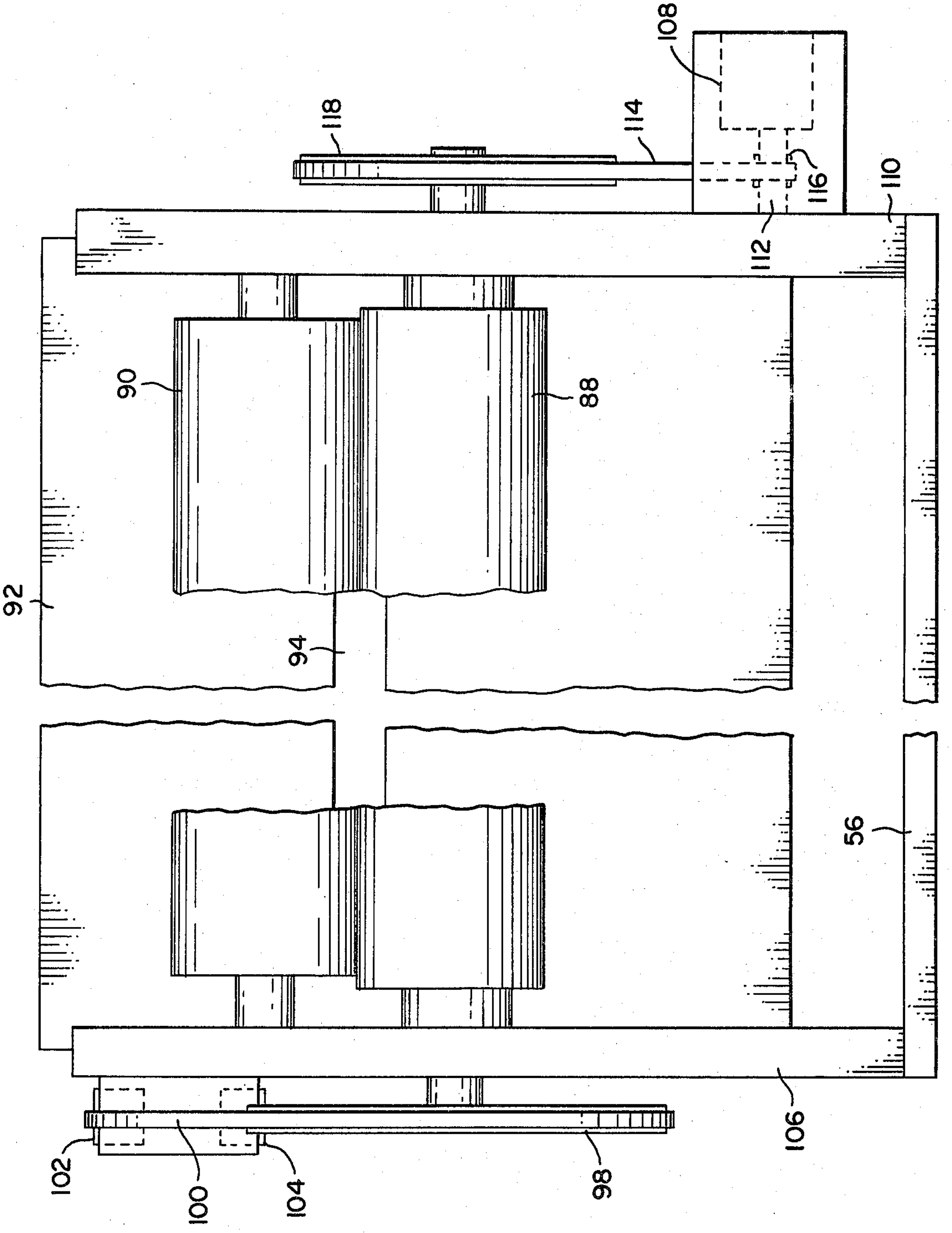
FIG. 5 is a front elevation of the FIG. 4 printer components.

FIG. 5 is an elevation of the fuser unit and drive mechanism of the subject printer as would be seen from the right side of FIG. 4. Drive motor 108 is secured to support 110, motor output shaft 112 extending through the support and being geared with belt 114 through pulley 116.

Belt 114 is further geared to fuser roller 88 through pulley 118. Roller 90 is suitably friction mounted in contact with driven roller 88, thereby providing opposite sense rotation of these rollers to provide for the pulling of paper through the nip thereof and horizontally outwardly of the plane of FIG. 5. Belt 100 is geared to driven roller 88 through pulley 98 to provide drive for belt 100.

Figure 6:
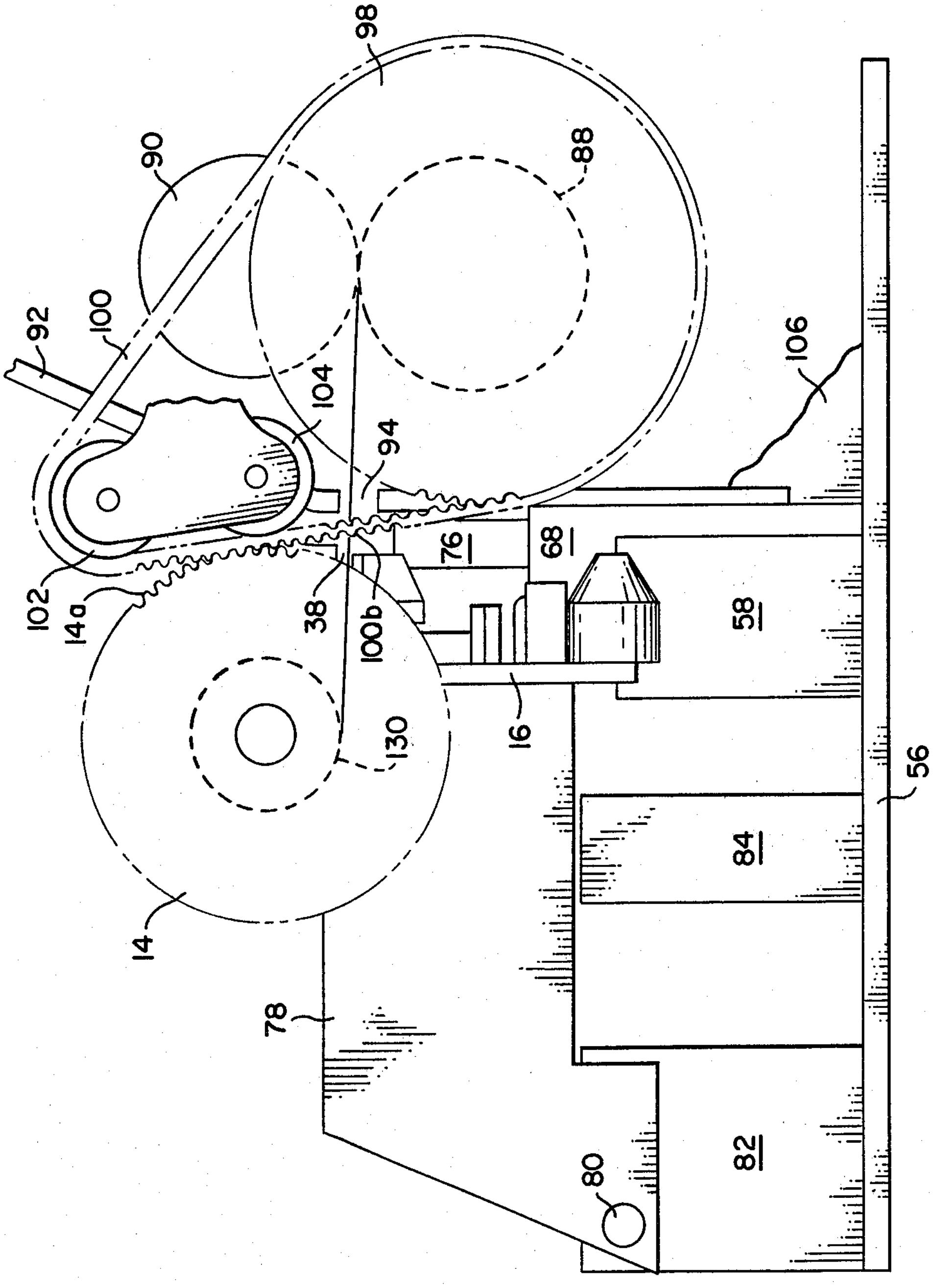
FIG. 6 is a side elevation of components of FIGS. 1 and 5 in jointly operative relationship.

Referring now to FIG. 6, the tape deck mechanism of FIGS. 1–3 and the fusing/drive mechanisms of FIGS. 4–5 are shown in mutually operative relation with gear 14 of the tape deck mechanism in meshed disposition with belt 100 of the drive mechanism. Teeth 14*a* of the gear are in residence in grooves 100*b* of belt 100 over the expanse 100*a* (FIG. 4) of belt 100 supported between rollers 102 and 104 and now displaced from such off-verticle arrangement of FIG. 4 to resiliently conform to the accurate configuration of gear 14. Such enmeshing of gear 14 teeth and belt 100 grooves occurs in the course of rotation of support 78 clockwise from its FIG. 3 attitude into its FIG. 1–2 attitude, since the gear and belt are disposed in an interference path, each accessible exteriorly of their supports. The clutching action as between gear 14 and belt 100 provides for the imparting of drive provided by drive motor 108 through driven roller 88 and gear 98 (FIG. 5) to drive paper feed elements, to be discussed in connection with FIG. 7 below. The assembly of parts in FIG. 6 thus provides for coordinated movement from a common drive source for each of the paper advancing elements, in particular fusion roller 88. Equally significant, such arrangement provides for the composite definition of paper feed path by the relatively movable parts of the printer of the invention.

Figure 7:
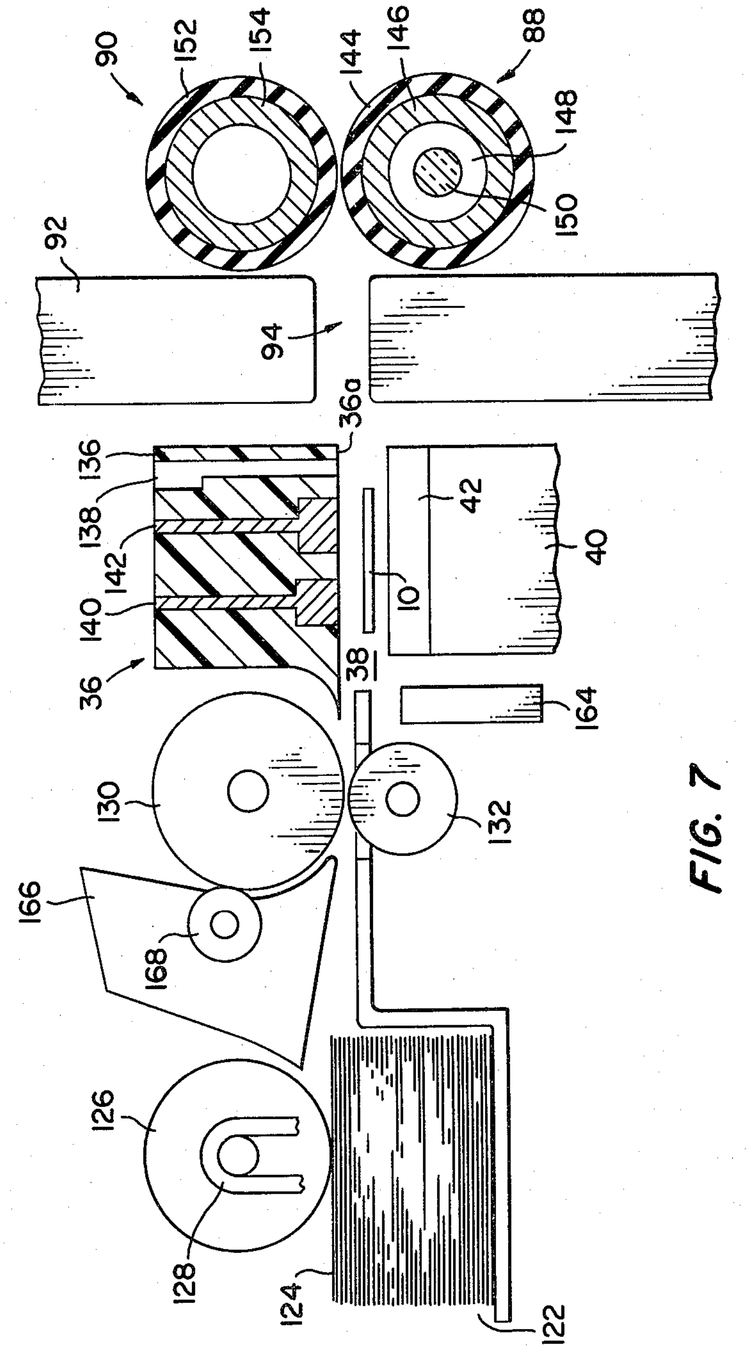
FIG. 7 is an enlarged side elevation, partly sectioned to show detail, of the portion of the printer involved in establishing paper path length.

Paper bin 122 of FIG. 7 seats individual sheets 124 of image recording medium, such as paper, in stacked relation to be dispensed individually rightwardly by paper feed roller 126. Roller 126 is driven by belt 128 selectively to advance the top sheet 124 into the nip of paper advance rollers 130 and 132, roller 130 being driven again selectively by belt 100 through pulley 14 to advance sheet 124 into registry with transfer electrode 36. In this connection, when the paper has advanced by rollers 126 and 130 to the point of being sensed by paper sensor 164, the sensor provides an output signal used to interrupt drive to rollers 126 and 130, thus discontinuing advance of sheet 124. At this juncture, the logic control of the printer determines the location on sheet 124 as to where the line or lines of text on tape 100 should be printed and provides that roller 130 be selectively driven to provide for registry of such location on sheet 124 with the print electrode of transfer electrode 36. Drive of roller 130 is again discontinued and text transfer effected. For subsequent transfers, roller 130 is selectively driven and stopped to provide for line by line, or lines by lines transfer of further text.

Transfer electrode 36 includes an electrically insulative body 136 which defines vacuum duct 138 and openings for situating print electrode 140 and tape edge electrode 142 adjacent the paper path, i.e., in facing relation to resilient pad 42 on platen 40.

Immediately rightwardly in FIG. 7 of transfer electrode 36 and platen 40 is situated heat shield 92. Channel 94 of heat shield 92 is aligned with the nip of paper advance rollers 130 and 132 and with the undersurface **36*a* of transfer electrode 36. Rightwardly of heat shield 92 also in such aligned relation is the nip of fuser roller 88 and pressure roller 90. Fuser roller 88 has its outer periphery comprised of a rubber composition layer 144, supported interiorly by metal cylinder 146 of good heat conducting material, such as aluminum. Cylinder 146 is supported for rotation by bearings (not shown) situated endwise of cylinder 146 and interiorly thereof in open area 148 bounded radially inwardly by quartz tube 150. Tube 150 is thus non-rotative and may be electrically powered by socket connection thereto aside support 110 (FIG. 5). Pressure roller 90 has its outer periphery defined by rubber composition layer 152, which is supported by metal hollow cylinder 154**, also of aluminum or like good heat conducting material.

By design choice, e.g., by selecting the diameter of roller 88 to exceed slightly the diameter of paper advance roller 130, the fusion station will dominate over the paper advance station in respect of paper translation, such that the fusion roller will apply a force to the paper in excess of that applied to the paper by rollers 130 and 132 and that fusion will take place under predetermined paper advance conditions.

Individual sheets may be hand fed to the printer by inserting same against guide 166 into the nip of rollers 130 and 168.

Figure 8:
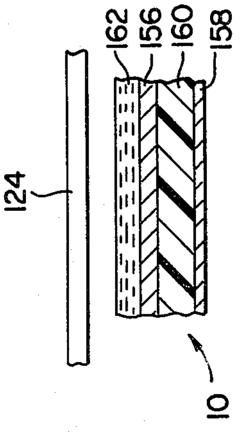
FIG. 8 illustrates a sectioned view of the magnetic recording tape and paper in disposition preparatory to image transfer.

The structure of tape 10 is seen in FIG. 8 as including electrically conductive layers 156 and 158, an electrically insulative layer 160 therebetween and magnetizable outer layer 162. Further detail as to tape magnetization, pixal definition and effects of tape premagnetization by unit 18 (FIG. 1) is set forth in commonly-owned copending patent application Ser. No. 268,526, entitled "Improvements in Magnetographic Recording", to which reference is hereby made. Like reference is now made to commonly-owned copending patent applications Ser. Nos. 228,526 and 253,997, respectively entitled "Magnetic Toner Transfer Method and Apparatus" and "Apparatus for Preventing Removal of Toner from Transferred Images", which relate details as to velocity movement profiles governing relative approaching movement as between tape and paper to avoid image disturbance and as to the creation of electrostatic fields and the effect of corotron charging of the tape for maintaining visual image integrity during and immediately following image transfer.

As will be appreciated from the foregoing discussion and FIGS. 1 and 7, tape 10 is horizontally advanced into the plane of FIG. 7 and is stopped with a toner-developed line or lines of text in registry with transfer electrode 36. Sheet 124 is advanced such that its assigned space for recording a visual image of such text is in registry atop tape 10 (FIG. 8) in channel 38. Vacuum applied through duct 138 draws the paper to surface **36*a*. Platen 40 is displaced upwardly to place pad 42 in engagement with tape layer 158, which is maintained at electrical ground potential. Tape layer 162 is now engaged with sheet 124. Electrical pulses are applied selectively to electrodes 140 and 142, both to effect image transfer to sheet 124 and to maintain transferred image integrity upon withdrawal of platen 40. Sheet 124 is now advanced through channel 94 to be engaged by rollers 88 and 90** for fusion of the visual image.

In one of its several aspects, the invention provides for the production of a preliminary, i.e., unfused, visual image through the arrangement of first and second components respectively movably supported and immobilized. In this aspect, movement control means such as elements 82, 84, 78 and 80 (FIG. 2) are connected to support means for the components, e.g., substrate 16 and base 56 whereby selected first components are placed in engagement with selected second components, e.g., head 60 with tape 10, roller 70 with tape 10, and belt 100 with gear 14 of the tape advancing means.

In another aspect, the invention affords limited paper path length and yet ready access to the tape deck by its provision of the improvement wherein paper path is defined by successive channels, each extending in a common direction through different printer parts, e.g. substrate 16 and shield 92, one such channel being movable into and out of registry with the composite paper movement path of the printer.

In a further cumulative aspect, the invention affords joint satisfaction of the above-referenced design demands by its provision of a composite printer wherein tape deck and other component access is provided along with limited paper path and master/slave drive relationship from fusion apparatus to paper advance. Suitable indicia on the tape, e.g, holes therethrough, are detected by detector 28 (FIG. 1) and appropriate control circuitry is provided for controlled incrementing of drive motor **12*a*** to accomodate tape movement cessation for image transfer and tape advance for formation of latent magnetic images and toner-development thereof.

Various changes as are or become evident to those skilled in the art may be introduced in the depicted and described embodiment without departing from the invention. The preferred embodiment is thus intended an illustrative and not in a limiting sense. The true spirit and scope of the invention is set forth in the following claims.

What is claimed is:

1. Apparatus for magnetographic recording and production of a permanent visual image on an image recording medium, comprising:

(a) first means responsive to electrical information signals for producing a preliminary visual image on said image recording medium, said first means including (1) first support means supporting first components including:

(1a) a magnetizable recording medium on which said visual images are recorded responsive to said signals and are then made visual by developing them with toner, (1b) means for advancing said magnetizable recording medium, and (1c) means for transferring a toner-developed image from said magnetizable recording medium to said image recording medium, and said first support means is movable to collectively move said first components between a first position wherein said first components cooperate to produce the permanent visual image on the image recording medium and a second position wherein said first components may be accessed, and (2) second support means and fixedly supporting second components of said first means for registration with selected ones of said first components upon such movement of said first support means from such second position into said first position thereof; and (b) second means for receiving said image recording medium from said first means for receiving said image recording medium from said first means and rendering said preliminary visual image permanent, said first support means and said second support means defining respective first and second channels therein for passage of said image recording medium, said first and second channels being selectively registered upon said movement of said first support means from said second position to said first position thereof to provide a composite channel for movement of said image recording medium through said apparatus.

2. The apparatus claimed in claim 1 wherein said first means and said second means include respective first and second roller means for advancing said image recording medium through said composite channel, said second means including a drive source coupled to said second roller means, said apparatus further including coupling means for selectively coupling said drive source to said first roller means upon said movement of said first support means from said access position to said operative position thereof.

3. The apparatus claimed in claim 2 wherein said second roller means exerts advancing force upon said image recording medium in excess of the advancing force applied to said image recording medium by said first roller means.

4. The apparatus claimed in claim 3 wherein said second roller means includes a fusing roller, said apparatus including heat shielding means disposed between said first and second roller means.

5. The apparatus claimed in claim 4 wherein said heat shielding means includes a passage therethrough constituting a portion of said second channel.

6. The apparatus claimed in claim 1 wherein said second components include means responsive to said electrical information signals for producing a magnetic image in said magnetizable recording medium and means for applying developing toner to said magnetizable recording medium.

7. The apparatus claimed in claim 6 wherein said apparatus is upstanding, said second components being disposed vertically below said first components placed in registry therewith upon said movement of said first support means from said access position to said operative position thereof.

8. In the magnetographic printer of type having a magnetizable recording medium, means for advancing said magnetizable recording medium in a preselected first direction through recording, toner developing and image transfer stations, a visual image recording medium, means for advancing said visual image recording medium through such image transfer station in a second direction orthogonal to said preselected first direction and means for fusing toner-developed images transferred from said magnetizable recording medium to said image recording medium, the improvement wherein the composite movement path of said visual image recording medium through said printer is comprised of successive channels, each extending in said second direction through first and second different parts of said printer, such printer first part being supported for movement relative to such printer second part such that the channel of said printer first part is movable into and out of registry with said composite image recording medium movement path.

9. The invention claimed in claim 8 wherein said printer first part comprises a substrate defining the channel therethrough and supporting components of said image transfer station.

10. The invention claimed in claim 9 wherein said printer second part supports said means for fusing images in position adjacent the channel extending therethrough.

11. The invention claimed in claim 10 wherein said printer second part includes heat shielding means in part defining the channel extending therethrough.

12. The invention claimed in claim 8 wherein said substrate further supports said magnetizable recording medium and such means for advancing same.

13. Apparatus for magnetographic recording and production of a visual image on an image recording medium, comprising:

(a) first support means for collectively supporting
(1) a magnetizable recording medium,
(2) means for advancing said magnetizable recording medium,
(3) means for advancing said image recording medium, and
(4) a visual image transfer unit;

(b) second support means for fixedly supporting
(1) a magnetic recording head,
(2) a toner application roller, and
(3) a drive source; and (c) movement control means connected to such first and second support means and supporting relative movement therebetween to dispose said magnetic recording head and said toner application roller in engagement with said magnetizable recording medium and to engage said drive source with such image recording medium advancing means.

14. The apparatus claimed in claim 13 wherein said movement control means supports relative rotative movement between said first and second support means.

* * * * *